United States Patent [19]
Lee

[11] 4,355,326
[45] Oct. 19, 1982

[54] BANDWIDTH ENHANCEMENT NETWORK FOR COLOR TELEVISION SIGNALS

[75] Inventor: Ronald B. Lee, Skokie, Ill.

[73] Assignee: Zenith Radio Corporation, Glenview, Ill.

[21] Appl. No.: 233,524

[22] Filed: Feb. 11, 1981

[51] Int. Cl.³ .............................................. H04N 5/21
[52] U.S. Cl. ....................................... 358/37; 358/36; 358/21 R
[58] Field of Search ................... 358/21 R, 36, 37, 38, 358/39, 40

[56] References Cited
U.S. PATENT DOCUMENTS

| | | | |
|---|---|---|---|
| 3,778,543 | 12/1973 | Lowry | 358/36 |
| 4,183,051 | 1/1980 | Richman | 358/37 |
| 4,187,917 | 1/1980 | Richman | 358/36 |
| 4,245,239 | 1/1981 | Richman | 358/37 |

Primary Examiner—Tommy P. Chin

[57] ABSTRACT

A network is described for use in enhancing the bandwidths of color signals in a color television system. The network is a feedback arrangement in which amplifiers multiply each color signal by a variable factor K to provide manifold color signals. High frequency luminance components are inserted into the modified color signals to develop high frequency color output signals. The modified color signals are weighted by selected coefficients and summed. The value of the summed signal is used to vary the factor K so that the high frequency luminance components in the color output signals are substantially equal to the high frequency components of the luminance signal.

21 Claims, 5 Drawing Figures

BANDWIDTH ENHANCEMENT NETWORK FOR COLOR TELEVISION SIGNALS

BACKGROUND OF THE INVENTION

This invention is generally directed to improvements in color television systems. It is particularly directed to networks for enhancing the bandwidths of relatively narrow band color signals.

Commercial television receivers typically receive a broadcast signal which includes a relatively wideband Y (luminance) signal and relatively narrow band I and Q color signals. A black and white television image is developed by applying the Y signal to a CRT (cathode ray tube). To develop a color image, the I and Q signals are demodulated to produce relatively narrow band R-Y, B-Y and G-Y color-difference signals. The latter signals are then combined with the Y signal and applied to a CRT.

Although the above-described signal processing technique generates commercially acceptable images, it is known that visible image errors are developed. For example, combining each color-difference signal with equal proportions of the Y signal at the receiver effectively attributes to each color-difference signal an equal portion of the high frequency Y components. In the general case, the primary colors do not contribute equally in the development of the high frequency Y components as the television signal is normally developed. Hence, attributing to them equal high frequency Y components at the receiver produces noticeable errors in the reproduced television image.

To overcome the problem described above, it has been proposed that, under certain conditions, each of the three color-difference signals detected in the receiver be modified so as to include its own unique, controllable portion and polarity of the high frequency components of the Y signal. U.S. Pat. No. 4,181,917 discloses that this may be accomplished by inferring that the high frequency components of the Y signal should be included in each color-difference signal according to the ratio which the derivative of each color-difference signal's low frequency components bears to the derivative of the Y signal's low frequency components. Thus, each color-difference signal is combined with a different amount and the appropriate polarity of "inferred highs" contained in the Y signal. This process is referred to herein as "chrominance bandwith enhancement".

A problem with the enhancement scheme referred to above is that it is very difficult to determine the ratio which the derivative of the low frequency color difference components bears to the derivative of the low frequency Y components. Since both derivatives approach zero near the edges of a luminance transition, it is difficult to obtain an accurate ratio determination at those times.

A related problem has to do with the effect which the bandwidth enhanced color-difference signals can have on the luminance portion of the television image. Ideally, they have no effect on it. However, because of the circuit implementation suggested in the above-mentioned patent, it is difficult to obtain bandwidth enhanced color signals which do not have an undesirable effect on the television image. Even minor variations in component tolerances can result in image distortions. Consequently, it has been difficult to include this type of chrominance bandwidth enhancement in color television receivers or in color studio equipment.

OBJECTS OF THE INVENTION

It is a general object of the invention to provide an improved bandwidth enhancement network for use in a color television system.

It is a more specific object of the invention to provide a bandwidth enhancement network which is relatively insensitive to component tolerances and other operating variables.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

Figure 1:
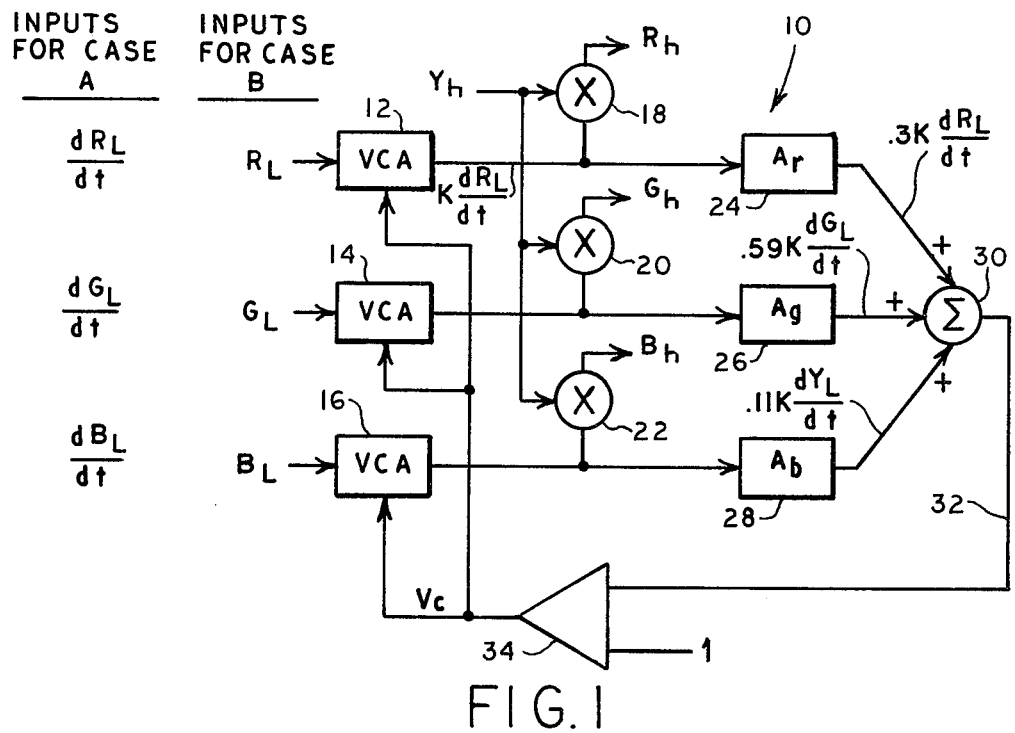
FIG. 1 shows a bandwidth enhancement network according to the invention.

In NTSC color systems, a luminance signal (Y) can be described by the equation: $Y = A_r R + A_b B + A_g G$. The coefficients $A_r$, $A_b$ and $A_g$ are constants, and the symbols R, B and G refer to the three color components of the television signal. The luminance signal is a relatively wideband signal, wherefore, it can be described as having low frequency components $Y_L$ and high frequency components $Y_h$. Thus, $Y = Y_L + Y_h$.

The color components R, B and G may also be thought of as including low frequency components and high frequency components. For example, $R = R_L + R_h$. The high frequency components of the luminance signal may, therefore, be defined by equation A as follows:

$$\text{Eq. A:} \quad Y_h = A_r R_h + A_b B_h + A_g G_h$$

The bandwidth enhancement system disclosed in U.S. Pat. No. 4,181,917 processes the luminance (Y) signal and narrowband color signals to increase the bandwidth of those color signals. Specifically, a selected amount and polarity of the high frequency luminance components $(Y_h)$ is added to each narrow band color signal. Thus, for a red color signal, $R_h$ identifies the high frequency luminance components which are developed and added to the relatively narrow band red signal $(R_L)$ to develop an enhanced bandwidth red color signal.

In one mode of enhancement, referred to herein as "Case A", $R_h$ is developed by dividing the first derivative of $R_L$ by the first derivative of $Y_L$ and then multiplying the quotient by $Y_h$. Equation B below describes $R_h$ for the Case A condition.

$$\text{Eq. B:} \quad R_h = Y_h [(dR_L/dt) \div (dY_L/dt)]$$

Green $(G_h)$ and blue $(B_h)$ high frequency components are developed in a similar manner for "Case A" conditions. Such Case A conditions occur when edges or sharp color transitions are present in the video signal.

When the video signal contains relatively uniform color areas having little high frequency color detail (Case B), the derivatives of the color signals are very small or non-existant. In Case B conditions, therefore, the high frequency red components are developed according to equation C below:

Eq.C: $R_h = Y_h(R_L \div Y_L)$

The high frequency components of the other color signals are developed similarly.

To avoid introducing errors in the reproduced television image, it is important that equation A be continuously satisfied. Any modification to $R_h$, for example, must include a compensating change to $B_h$ or $G_h$ (or both) to maintain the identity described by equation A. Otherwise, the high frequency luminance components of the color signals will not match the high frequency components of the luminance signal. Consequently, errors will be developed in the video image.

The equations B and C above take into account the need to maintain the identity described in equation A. That is, bandwidth enhancement that satisfies equations B and C will also satisfy equation A. The problem resides in the implementation of a bandwidth enhancement system which satisfies those equations. The implementation disclosed in the patent referred to above is a feed forward system in which variations in component values are not compensated for. Hence, it is difficult to ensure compliance with equations A, B or C. Also, the need to take ratios of signals, many of which are small, can lead to unpredictable results.

Before describing the illustrative embodiments of the invention, a relationship used in certain of those embodiments should be understood.

In both equations B and C, $R_h$, $B_h$ and $G_h$ are all proportional to $Y_h$. That is to say:

$R_h = Y_h K_R$ $B_h = Y_h K_B$ $G_h = Y_h K_G$ where $K_R = R_L/Y_L$ for case B and $K_R = (dR_L/dt)/(dY_L/dt)$ for Case A. $K_B$ and $K_G$ are defined similarly to $K_R$. Substituting these relationships into equation A, a new relationship can be found as follows:

$Y_h = Y_h(A_r K_r + A_b K_B + A_g K_G)$

Dividing both sides of this equation by $Y_h$ gives:

Eq. D: $1 = A_R K_R + A_b K_B + A_g K_G$

Therefore, equation D may be used in place of equation A for both Case A and Case B type systems to properly develop bandwidth enhanced signals. The embodiments described below satisfy the identity represented by equation D.

Referring now to FIG. 1, the numeral 10 designates a bandwidth enhancement network useful in either Case A or Case B conditions. For Case A, the inputs to the network 10 include $dR_L/dt$, $dG_L/dt$ and $dB_L/dt$. For Case B, those inputs are changed to $R_L$, $G_L$ and $B_L$. In either case, those inputs are referred to herein as "color input signals" which are used to develop high frequency components identified as $R_h$, $G_h$ and $B_h$. The latter components may be added to $R_L$, $G_L$ and $B_L$, respectively, to generate enhanced bandwidth color output signals.

Assuming Case A operation, the three color input signals are received by means which multiply each color input signal by a variable factor K to provide modified color signals. In the illustrated embodiment, such multiplication is effected by three variable gain devices 12, 14 and 16, each of which may be a conventional voltage controlled amplifier (VCA). Each of the devices 12, 14 and 16 responds to a control signal $V_c$ for modifying the amplitude of its received color input signal by a variable factor K. The factor K represents the gain of the devices 12, 14 and 16 as modified by the control signal $V_c$. Thus, the output of the device 12 corresponds to K $dR_L/dt$; the output of the device 14 corresponds to K $dG_L/dt$; and the output of the device 16 corresponds to K $dB_L/dt$.

Coupled to the outputs of the devices 12, 14 and 16 are multipliers 18, 20 and 22. Each multiplier receives the high frequency luminance components ($Y_h$) for multiplying $Y_h$ times its other input to insert high frequency luminance components into the modified color signals. The multiplier outputs $R_h$, $G_h$ and $B_h$ constitute high frequency components which may be conventionally summed with $R_L$, $G_L$ and $B_L$ to develop the bandwidth enhanced color output signals.

Coupled to the output of the device 12 is a weighting network 24. The latter network weights the modified color signal which it receives by a coefficient $A_r$. Another weighting network 26 weights the output of the device 14 by a coefficient $A_g$. Similarly, a network 28 weights the output of the device 16 by a coefficient $A_b$. Preferably, the coefficients are selected such that $A_r$ is substantially equal to 0.3, $A_g$ is substantially equal to 0.59, and $A_b$ is substantially equal to 0.11.

The outputs of the three weighting networks are combined in a summer 30 so that the summer's output (lead 32) carries a summed signal as described by equation E below.

Equation E: Summed
Signal = $K[0.3 dR_L/dt + 0.59 dG_L/dt + 0.11 dB_L/dt]$

The value of the summed signal on lead 32 is sensed and, based on that sensed value, the control signal $V_c$ is developed to vary the value of the factor K such that the high frequency luminance components inserted in the output signals are substantially equal to the high frequency components of the luminance signal. For this purpose, a difference amplifier 34 receives the summed signal and a unity value reference signal. The amplifier 34 compares the value of the summed signal to the reference signal and develops a control signal $V_c$ which is representative of the difference between the reference signal and the summed signal. The control signal varies the gain of devices 12, 14 and 16 in this feedback network to vary K and to force the summed signal to equal 1 (the reference signal). Thus, equation D is satisfied, and K is forced to equal the inverse of $dY_L/dt$. Therefore, $R_h = y_h [(dR_L/dt) \div (dY_L/dt)]$. This is the Case A type correction called for by equation B to ensure that the high frequency luminance components in the bandwidth enhanced color signals are substantially equal to the high frequency components of the luminance signal.

For Case B conditions, the low frequency components $R_L$, $G_L$ and $B_L$ are applied to variable gain devices 12, 14 and 16. The network 10 operates as described above to develop the high frequency components of the bandwidth enhanced color signals. Those enhanced red color signals may be developed by applying $R_h$ and $R_L$ to a conventional summer. The other two enhanced color signals may be developed in a similar manner.

Figure 2:
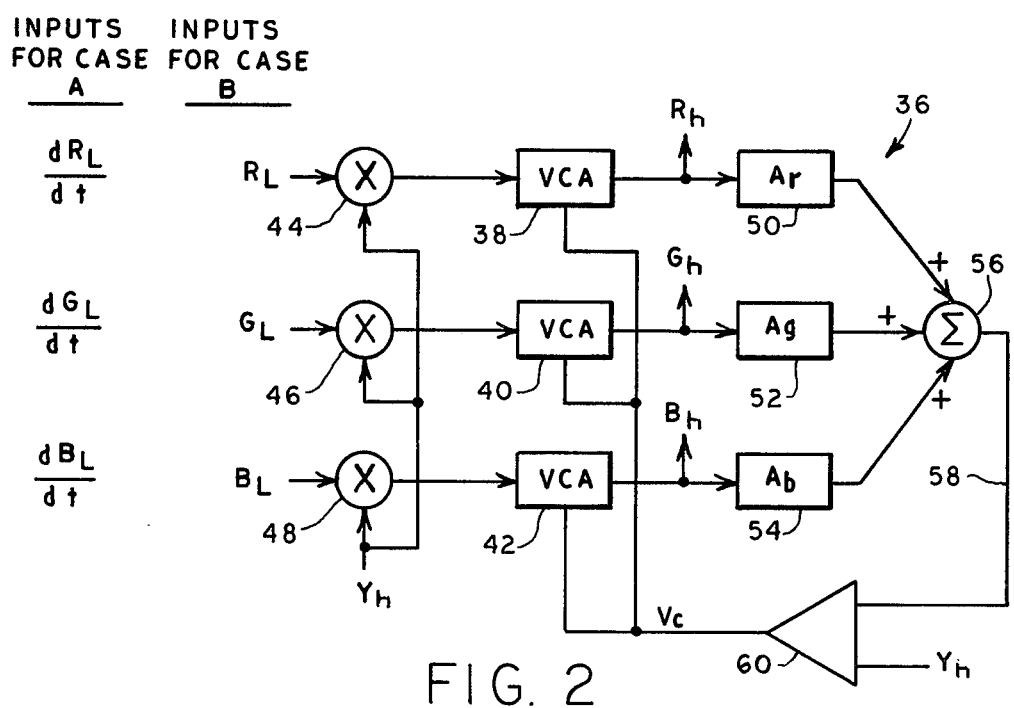
FIG. 2 shows another embodiment of a bandwidth enhancement network according to the invention.

Referring now to FIG. 2, another enhancement network 36 is shown which generally operates according to the principles of the FIG. 1 embodiment but which has a somewhat different circuit configuration. This network 36 also provides the high frequency components $R_h$, $G_h$ and $B_h$ of the bandwidth enhanced color output signals for either Case A or Case B operation. When it is to be used for Case B conditions, the inputs to the network 36 are the low frequency components of the color signals, i.e., $R_L$, $G_L$ and $B_L$. For Case A conditions, the inputs are the derivatives of $R_L$, $G_L$ and $B_L$.

Assuming Case B conditions, $R_L$, $G_L$ and $B_L$ are each multiplied by a variable factor K to provide modified color signals. Such multiplication is effected by three variable gain devices 38, 40 and 42. All of these devices respond to a control signal $V_c$ in the same manner as the embodiment of FIG. 1. In the present embodiment however, the color input signals are first multiplied by the high frequency luminance components $Y_h$. This function is provided by multipliers 44, 46 and 48. The output of each multiplier provides the input to one of the variable gain devices 38, 40 and 42. In response to these inputs, and in response to the control signal, the variable gain devices provide high frequency components of bandwidth enhanced color output signals at their respective outputs. These components are then weighted by selected coefficients by three weighting networks 50, 52 and 54. As in the FIG. 1 embodiment, the network 50 weights its input by a coefficient $A_r$ which is preferably selected to be substantially equal to 0.3. The network 52 weights its input by a coefficient $A_g$ which is preferably selected to be substantially equal to 0.59; and the network 54 weights its input by a coefficient $A_b$ which is preferably selected to be substantially equal to 0.11.

The weighted outputs of the networks 50, 52 and 54 are combined in a summer 56 to develop a summed signal on the lead 58. The signal on the lead 58 is, therefore, equal to $A_r R_h + A_g G_h + A_b B_h$. The value of this summed signal is sensed for varying the value of the factor K as a function of the value of the summed signal such that the high frequency luminance components in the bandwidth enhanced color output signals are substantially equal to the high frequency components of the luminance signal. To achieve this, the lead 58 is coupled to one input of a difference amplifier 60. The other input to the amplifier 60 constitutes the high frequency components of the luminance signal ($Y_h$). The amplifier 60 compares the value of the signal on lead 58 to $Y_h$ to develop a control signal $V_c$ representative of the difference between the summed signal and the high frequency luminance components. The three variable gain devices 38, 40 and 42 respond to the control signal by modifying the amplitude of their signal inputs by the same factor K.

Referring again to the amplifier 60, it can be seen that this amplifier forces $Y_h$ to equal $A_r R_h + A_g G_h + A_b B_h$. Hence, equation A is satisfied and the factor K is developed so that the enhanced bandwith color signals contain luminance contributions which are equal to the high frequency components of the luminance signal.

$R_h$, $G_h$ and $B_h$ may be combined with $R_L$, $G_L$ and $B_L$ in conventional summers to provide composite enhanced color signals which may be applied to the cathode ray tube of a color television receiver.

The network 36 operates as described above for Case A. As mentioned previously, the only difference is that the inputs to the network 36 are the derivatives of the low frequency components of the color signals.

Figure 3:
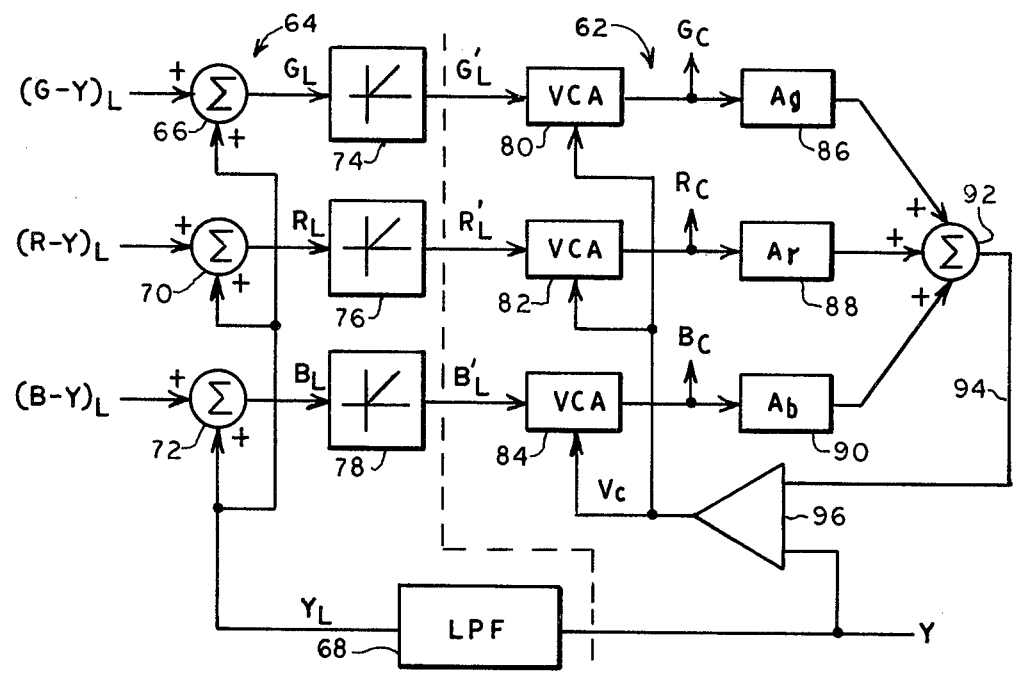
FIGS. 3 and 4 each illustrate an additional bandwidth enhancement network according to the invention.

Referring to FIG. 3, another bandwidth enhancement network is shown which employs the general principles discussed above. The numeral 62 designates the actual enhancement network (to the right of the dashed line) and the numeral 64 designates a conditioning circuit for the network 62. The network 62 is intended for Case B type operation, and the network 64 modifies color-difference signals prior to their input to the network 62.

As shown, a (G-Y) color-difference signal is applied to one input of a summer 66. The "L" following (G-Y) and the other color-difference inputs indicates that these color-difference signals are the limited bandwidth signals normally developed in a color television receiver.

The other input to the summer 66 is $Y_L$ (low frequency luminance components). $Y_L$ may be derived by applying full bandwidth luminance (Y) to a low pass filter 68. The output of the filter 68 is coupled to the summer 66 and to two additional summers 70 and 72.

By combining its two inputs, the summer 66 removes the low frequency luminance components from its color-difference input. Thus, the output of the summer 66 is $G_L$.

Imperfections in the color television receiver and the filter 68 may cause $G_L$ to have undesirable negative components. To remove any such components of the signal $G_L$, the output of the summer 66 may be coupled to a half-wave rectifier 74. The output of the rectifier 74 is designated as $G_L'$ and constitutes one of the color input signals to the network 62.

The other two color difference signals receive the same treatment. The summer 70 removes the low frequency luminance components from the (R-Y)$_L$ signal; and the summer 72 removes the low frequency luminance components from the (B-Y)$_L$ signal.

The outputs of summers 70 and 72 are applied to additional half-wave rectifiers 76 and 78. The outputs of rectifiers 76 and 78, $R_L'$ and $B_L'$, constitute the remaining two "color input signals" to the network 62.

The network 62 multiplies each color input signal by a factor K by means of variable gain devices 80, 82 and 84. Once again, the value of K is determined by a variable control voltage $V_c$. The outputs of devices 80, 82 and 84 are designed as $G_c$, $R_c$ and $B_c$ which are corrected color output signals having enhanced bandwidths.

Weighting networks 86, 88 and 90 weight the signals $G_c$, $R_c$ and $B_c$ by coefficients $A_g$, $A_r$ and $A_b$, respectively, and apply their weighted outputs to a summer 92. The summer 92 combines its inputs to produce a summed signal on a lead 94. As with the previous embodiments, the value of the summed signal is sensed to vary the value of the factor K as a function of the value of the summed signal such that the high frequency luminance components in the enhanced color output signals ($G_c$, $R_c$ and $B_c$) are substantially equal to the high frequency components of the luminance signal.

To achieve this result, a difference amplifier 96 receives the summed signal and the luminance signal, senses their difference, and generates the control voltage $V_c$ representative of that difference. The variable gain devices 80, 82 and 84 respond to the control signal by varying the value of K so that the two inputs to the amplifier 96 achieve substantial identity. That is, $Y=K\cdot[A_rR_L'+A_gG_L'+A_bB_L']$. The expression in brackets equals $Y_L$. Hence, $K=Y/Y_L$. The corrected color signal $R_c$ therefore equals $K R_L'$ or $R_L' (Y/Y_L)$. Since $Y=Y_H+Y_L$ $R_c=R_L' (Y_h/Y_L)+R_L'$. The expression $R_L' (Y_h/Y_L)$ is the expression for the high frequency contribution to the color signal for the Case B condition, and $R_L'$ is the low frequency component which was input to the network 62. Thus, the signal $R_c$ is a composite signal which may be applied to the CRT. The same is true of the signals $G_c$ and $B_c$.

Figure 4:
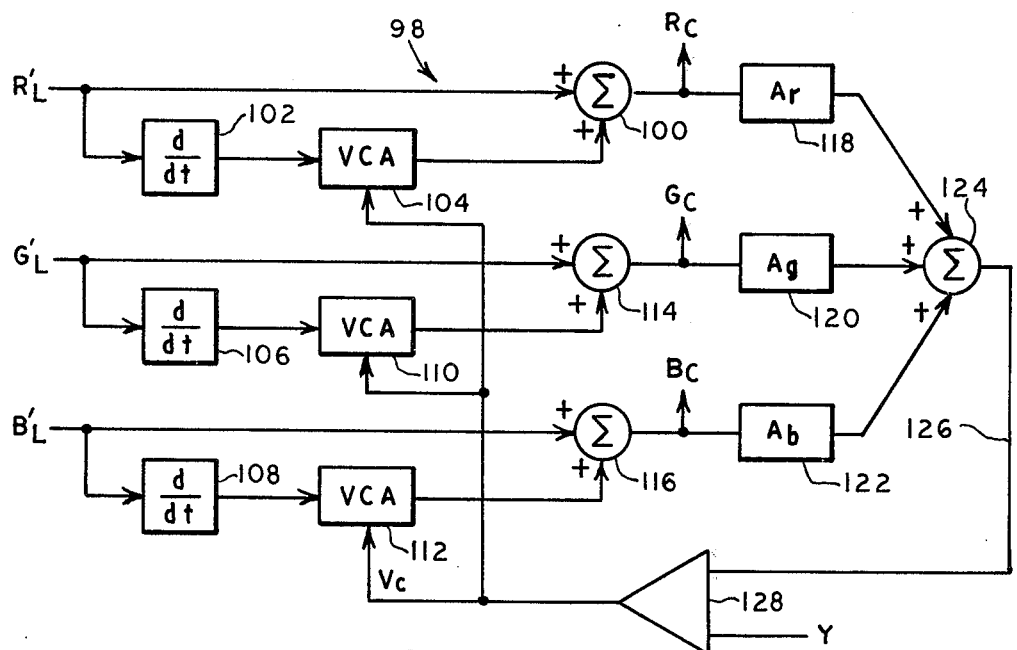

Referring to FIG. 4, another bandwidth enhancement network 98 is shown. This network provides composite enhanced bandwidth signals $R_c$, $G_c$ and $B_c$ for Case A conditions. Its inputs are $R_L'$, $G_L'$ and $B_L'$ which may be derived from color-difference signals by the network 64 of FIG. 3.

The color signal $R_L'$ is applied to a summer 100 and to a derivative network 102. The latter network develops the first derivative of the signal $R_L'$ and applies that derivative to a variable gain device 104. Thus, the device 104 receives the same type of color input signal which its counterpart device 12 (FIG. 1) receives under Case A conditions. The device 104 multiplies its received color input signal by a variable factor K to provide a modified color signal to the summer 100. Therefore, the output of the summer 100, $R_c$, equals $R_L'+K(d R_L'/dt)$.

Derivative networks 106 and 108 receive the signals $G_L'$ and $B_L'$, respectively, and drive variable gain devices 110 and 112. The outputs of devices 110 and 112 are applied as inputs to summers 114 and 116 which also receive the signals $G_L'$ and $B_L'$. The outputs of summer 114 and 116, $G_c$ and $B_c$, may be expressed in the same manner as the expression above for $R_c$.

The bandwidth enhanced signals $R_c$, $G_c$ and $B_c$ are applied to weighting networks 118, 120 and 122 to weight their respective inputs by the coefficients $A_r$, $A_g$ and $A_b$. Their weighted outputs are combined in a summer 124 to develop a summed signal on a lead 126. As before, the summed signal is sensed to vary the value of the factor K as a function of the value of the summed signal so that the high frequency luminance components in the bandwidth enhanced color signals are substantially equal to the high frequency components of the luminance signal. For this purpose, a difference amplifier 128 compares the summed signal to the luminance (Y) signal to develop a control signal $V_c$ representative of the difference between the summed signal and the Y signal. That control voltage is applied to the variable gain devices 104, 110 and 112 to vary their gain factor K.

It can be shown that the operation described above forces K to equal $Y_h$ divided by $dY_L/dt$. Hence, the output of variable gain device 104 equals $Y_h$ times $(dR_L'/dt)\div(dY_L/dt)$. Equation B is thus satisfied for the development of the high frequency portion of the enhanced bandwidth signal. Adding $R_L$ to it in the summer 100 provides a composite enhanced bandwidth signal having its high frequency and low frequency portions. The same explanation applies to the signals $G_c$ and $B_c$.

Referring again to FIGS. 1 and 2, the networks shown therein have been described as useful for Case A or Case B conditions. One such network (FIG. 1 or 2) may be included to accommodate Case A conditions and another such network (FIG. 1 or 2) may be included to accommodate Case B conditions. A condition sensing network may be included to determine which condition is present and to activate the appropriate enhancement network.

Figure 5:
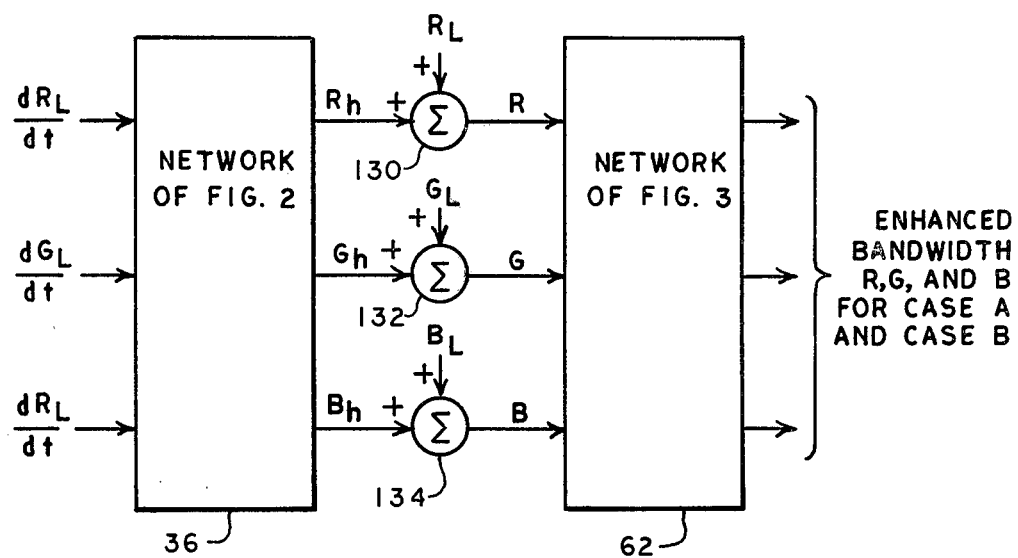
FIG. 5 shows an enhancement network which includes the network of FIG. 2 in cascade with the network of FIG. 3.

To avoid switching between enhancement networks as Case A changes to Case B and vice versa, a Case A network may be cascaded with a Case B network. For example, two networks similar to the one shown in FIG. 1 may be cascaded. Likewise, two networks similar to the one shown in FIG. 2 may be cascaded. Alternately, one of the networks shown in FIGS. 1 and 2 may be cascaded with the network shown in FIG. 3 to accommodate both the Case A condition and the Case B condition. FIG. 5 illustrates the network of FIG. 2 cascaded with the network of FIG. 3 to achieve this result.

As shown, a network 36 (the same as shown in FIG. 2) receives inputs $dR_L/dt$, $dG_L/dt$ and $dB_L/dt$. The outputs of network 36 are high frequency components $R_h$, $G_h$ and $B_h$ which are developed as previously described. Those outputs are applied to summers 130, 132 and 134, respectively. The summer 130 also receives the low frequency component $R_L$ to develop a composite enhanced bandwidth output signal identified as R.

The summers 132 and 134 receive the low frequency components $G_L$ and $B_L$, respectively, to develop composite enhanced bandwidth signals G and B.

Another enhancement network 62 (the same as shown in FIG. 3) receives the signals R, G and B. Network 62 operates as described previously and outputs enhanced bandwidth R, G and B signals which are enhanced for both Case A and Case B conditions.

From the foregoing description, it can be seen that the enhancement networks all serve to force the value of K to a level which ensures that proper enhanced bandwidth signals are developed. Those signals include high frequency luminance contributions whose total equals the high frequency components of the luminance signal. The feedback nature of the various networks compensates for component tolerances, temperature variations, and other operating variables.

A further advantage of the present invention is that none of the enhancement networks require circuitry for taking ratios or for effecting a division. Consequently, the illustrated networks provide reliable, predictable operation.

In construction, the variable gain devices may be conventional voltage controlled amplifiers; the summers may also be conventional. The weighting networks may be conventional multipliers which multiply by a constant gain factor equal to their coefficients. The different amplifiers, and all other components may also be of conventional construction.

In the foregoing description, various summers, multipliers and the like receive a component of a luminance signal and a component of a color signal. Both components should be received by the summer or the like at the same time. In a receiver having such luminance and color components which are not time coincident with each other, those skilled in the art will recognize that one of those components should be delayed to achieve the required time coincidence.

Another factor to consider is the relative D.C. levels of color-difference signals and luminance signals when they are to be added to each other or subtracted from each other (as in FIG. 3). In receivers wherein the $(R-Y)_L$ signal, for example, has a different D.C. level than the $Y_L$ signal, the two signals may first be subtracted from each other to obtain $R_L$, and the latter signal may then be clamped to a predetermined D.C. voltage level. Such clamping may be achieved by conventional techniques.

Although the invention has been described in terms of preferred structure, it will be obvious to those skilled in the art that many modifications and alterations may be made without departing from the invention. All such modifications and alterations are deemed to be within the spirit and scope of the invention as defined by the appended claims.

What is claimed is:

1. In a television system which provides a luminance signal having high frequency and low frequency components and which provides relatively narrow band color input signals, a feed-back network for enhancing the bandwidth of the color input signals, comprising:

multiplying means receiving the color input signals and the high frequency luminance components for multiplying at least the color input signals by a variable factor K and for developing high frequency color output signals such that each one of said color signals comprises the product of respective one of said input color signals, the factor K, and the high frequency luminance components;

means receiving at least the K multiplied color input signals for weighting each such received signal by a selected coefficient;

means for combining the weighted signals to develop a summed signal; and means coupled to the combining means and to the multiplying means for sensing the value of the summed signal and for varying the value of the factor K as a function of the value of the summed signal such that the high frequency luminance components in the color output signals are substantially equal to the high frequency components of the luminance signal.

2. A network as set forth in claim 1 wherein the color input signals include a red color input signal, a green color input signal and a blue color input signal, and wherein said weighting means weights its received red signal by a coefficient substantially equal to 0.3, it weights its received blue signal by a coefficient substantially equal to 0.11, and it weights its received green signal by a coefficient substantially equal to 0.59.

3. A network as set forth in claim 1 wherein said sensing means includes a difference amplifier receiving the summed signal and a reference signal for developing a control signal representative of the difference between the value of the summed signal and the reference signal, and wherein said multiplying means includes, for each color input signal, a variable gain device responsive to the control signal for altering the amplitude of its received color input signal.

4. A network as set forth in claim 3 wherein said reference signal constitutes the high frequency components of the luminance signal.

5. A network as set forth in claim 1 wherein said multiplying means includes three variable gain devices, each receiving one of three color input signals and each being responsive to a control signal for altering the amplitude of its received color input signal, and wherein said multiplying means further includes three multipliers, each multiplier receiving the high frequency luminance components and the output of one variable gain device such that each multiplier develops a high frequency color output signal.

6. A network as set forth in claim 5 wherein said weighting means includes three weighting networks, each such network receiving the output of one variable gain device for weighting its respective input by a selected coefficient.

7. A network as set forth in claim 5 wherein said sensing means includes a difference amplifier receiving the summed signal and a unity value reference signal for developing said control signal representative of the difference between the summed signal and the reference signal, including means for applying the control signal to each of the variable gain devices.

8. A network as set forth in claim 1 wherein said multiplying means includes three multipliers, each multiplier receiving one of three color input signals and the high frequency luminance components for outputting a color input signal multiplied by the high frequency luminance components, and wherein said multiplying means further includes three variable gain devices, each such device receiving the output of one multiplier and being responsive to a control signal for altering the amplitude of its received signal to provide a high frequency color output signal.

9. A network as set forth in claim 8 wherein said weighting means includes three weighting networks, each of which receives the output of one variable gain device for weighting its respective input by a selected coefficient.

10. A network as set forth in claim 8 wherein said sensing means includes a difference amplifier receiving the summed signal and the high frequency luminance components for developing said control signal representative of the difference between the summed signal and the high frequency luminance components, including means for applying the control signal to each of the variable gain devices.

11. In a television system which provides a luminance signal having high frequency and low frequency components and which provides relatively narrow band color input signals, a feed-back network for enhancing the bandwidth of the color input signals, comprising:

three variable gain devices, each of which receives a different one of three color input signals and each of which is responsive to a control signal for outputting a color signal whose amplitude varies as a function of the value of the control signal;

three multipliers, each of which receives the output of one variable gain device in addition to the high frequency luminance components for outputting a high frequency color output signal whose bandwidth is enhanced by the contribution of the high frequency luminance components;

three weighting networks, each of which receives the output of one of the variable gain devices for developing an output which is weighted by a selected coefficient;

means for combining the outputs of the weighting networks to develop a summed signal; and means for comparing the summed signal to a unity value reference signal, for developing said control signal representative of the difference between the summed signal and the reference signal, and for applying the control signal to the three variable gain devices.

12. A network as set forth in claim 11 wherein each color input signal received by the variable gain devices corresponds to the low frequency components associated with a given color.

13. A network as set forth in claim 11 wherein each color input signal received by the variable gain devices corresponds to the derivative of the low frequency components associated with a given color.

14. In a television system which provides a luminance signal having high frequency and low frequency components and which provides relatively narrow band color input signals, a feed-back network for enhancing the bandwidth of the color input signals, comprising:

three multipliers, each of which receives a different one of three color input signals in addition to the high frequency components of the luminance signal to develop a color signal output which includes luminance components;

three variable gain devices, each of which receives the output of one of the multipliers and which is responsive to a control signal for varying the amplitude of its received signal to develop a high frequency color output signal;

three weighting networks, each of which receives one of the color output signals for developing an output which is weighted by a selected coefficient;

means for combining the outputs of the weighting networks to develop a summed signal; and means for comparing the summed signal to the high frequency luminance components for developing said control signal representative of the difference between the summed signal and the high frequency luminance components, and for applying the control signal to the three variable gain devices.

15. A network as set forth in claim 14 wherein each color input signal received by the multipliers corresponds to the low frequency components associated with a given color.

16. A network as set forth in claim 14 wherein each color input signal received by the multipliers corresponds to the derivative of the low frequency components associated with a given color.

17. In a television system which provides luminance signal having high frequency and low frequency components and which provides relatively narrow band color input signals, a feedback network for enhancing the bandwidth of the color signals, comprising:

three derivative networks, each receiving a different one of three color input signals for outputting the derivative of its color signal input;

three variable gain devices, each of which receives the output of a derivative network and responsive to a control signal for developing a derivative output whose amplitude is a function of the value of the control signal;

three summers, each of which receives one of the three color signals and the output of the variable gain device associated with that one color signal for outputting an enhanced bandwidth color output signal;

three weighting networks, each of which receives the output of one of the summers for developing an output which is weighted by a selected coefficient;

means for combining the outputs of the weighting networks to develop a summed signal; and means for comparing the summed signal to the luminance signal, for developing said control signal representative of the difference between the summed signal and the luminance signal, and for applying the control signal to three variable gain devices, said coefficients being selected so that the control signal modifies the gain of each of the variable gain devices to an extent which causes in the summers' output signals to have total high frequency luminance components which are substantially equal to the high frequency components of the luminance signal, whereby the summers' outputs constitute bandwidth enhanced color signals.

18. A network as set forth in claim 17 wherein each color signal received by the derivative networks and the summers corresponds to the low frequency components associated with a given color.

19. In a television system which provides a luminance signal having high frequency and low frequency components and which provides relatively narrow band color input signals, a feedback network for enhancing the bandwidth of the color input signals, comprising:

three variable gain devices, each of which receives a different one of three color input signals and each of which is responsive to a control signal for outputting a color signal whose amplitude varies as a function of the value of the control signal;

three weighting networks, each of which receives the output of one of the variable gain devices for developing an output which is weighted by a selected coefficient;

means for combining the outputs of the weighting networks to develop a summed signal; and means for comparing the summed signal to the luminance signal, for developing said control signal representative of the difference between the summed signal and the luminance signal, and for applying the control signal to the three variable gain devices, said coefficients being selected so that the control signal modifies the gain of the variable gain devices to an extent that the outputs of the latter devices have high frequency luminance contributions which are substantially equal to the high frequency components of the luminance signal, whereby the outputs of the variable gain devices constitute bandwidth enhanced color signals.

20. A network as set forth in claim 19 wherein each color input signal received by the variable gain devices corresponds to the low frequency components associated with a given color.

21. In a television system which provides a luminance signal having high frequency and low frequency components and which provides the derivative of relatively narrow band color signals, a system for enhancing the bandwidth of the color signals, comprising:

a first network which includes:

means receiving the derivative of the narrow band color signals and high frequency luminance components for inserting high frequency luminance components into each derivative signal to provide luminance enhanced color signals;

means for multiplying each luminance enhanced color signal by a variable factor K to provide high frequency color signal components;

means coupled to the output of said multiplying means for weighting each high frequency color signal component by a selected coefficient;

means for combining the weighted components to develop a summed signal;

means coupled to said combining means and to the multiplying means for sensing the value of the summed signal and for varying the value of the factor K as a function of the value of the summed signal such that high frequency luminance components in the high frequency color signal components are substantially equal to the high frequency components of the luminance signal;

means for combining each high frequency color signal component with its corresponding narrow band color signal to provide composite color signal outputs; and a second network comprising:

means receiving the outputs of said first network for multiplying each composite color signal by a second variable factor to provide composite high frequency color output signals;

means for weighting each multiplied composite high frequency color output signal by a selected coefficient;

means for combining the weighted signals to develop a second summed signal; and means coupled to the latter combining means and to the latter multiplying means for sensing the value of the second summed signal and for varying the value of the second variable factor as a function of the value of the second summed signal such that the high frequency luminance components in the composite high frequency color output signals are substantially equal to the high frequency components of the luminance signals, whereby the composite high frequency color output signals developed by the second network are properly enhanced, irrespective of the type of high frequency detail in the luminance signal.

* * * * *